(12) United States Patent
Rohn

(10) Patent No.: US 9,847,201 B2
(45) Date of Patent: Dec. 19, 2017

(54) CIRCUIT PROTECTION APPARATUS AND METHOD OF SETTING TRIP PARAMETERS THEREOF

(71) Applicant: EATON CORPORATION, Cleveland, OH (US)

(72) Inventor: David Raymond Rohn, Venetia, PA (US)

(73) Assignee: Eaton Corporation, Cleveland, OH (US)

( * ) Notice: Subject to any disclaimer, the term of this patent is extended or adjusted under 35 U.S.C. 154(b) by 629 days.

(21) Appl. No.: 14/186,082

(22) Filed: Feb. 21, 2014

(65) Prior Publication Data
US 2015/0243464 A1    Aug. 27, 2015

(51) Int. Cl.
| | | |
|---|---|---|
| H01H 71/74 | (2006.01) |
| H01H 71/02 | (2006.01) |
| H01H 69/01 | (2006.01) |
| H01H 71/12 | (2006.01) |
| H02H 3/00 | (2006.01) |
| H01H 71/04 | (2006.01) |

(52) U.S. Cl.
CPC ............ *H01H 71/74* (2013.01); *H01H 69/01* (2013.01); *H01H 71/02* (2013.01); *H01H 71/123* (2013.01); *H02H 3/006* (2013.01); *H01H 71/04* (2013.01); *H01H 2071/046* (2013.01); *H01H 2219/028* (2013.01)

(58) Field of Classification Search
USPC ........................ 361/115, 95, 93.2; 335/18, 21
See application file for complete search history.

(56) References Cited

U.S. PATENT DOCUMENTS

| | | | | |
|---|---|---|---|---|
| 4,331,997 A | * | 5/1982 | Engel | H02H 3/006 361/93.2 |
| 4,428,022 A | | 1/1984 | Engel et al. | |

(Continued)

FOREIGN PATENT DOCUMENTS

DE    198 40 552 A1    3/2000

OTHER PUBLICATIONS

European Patent Office, "International Search Report and Written Opinion for PCT/US2015/012131", dated Mar. 27, 2015, 9 pp.

*Primary Examiner* — Scott Bauer
*Assistant Examiner* — Tien Mai
(74) *Attorney, Agent, or Firm* — Eckert Seamans; Philip Levy; Grant Coffield

(57) ABSTRACT

A circuit protection apparatus includes separable contacts, an operating mechanism, an electronic trip unit storing a plurality of trip parameter combinations, wherein each of the trip parameter combinations specifies a certain value for each of a plurality of individual trip parameters, and a multi-position selector moveable among a plurality of predetermined positions and configured to enable selection of one of the predetermined positions. Each of the positions corresponds to a respective one of the trip parameter combinations, wherein the electronic trip unit is structured to, responsive to a chosen one of the plurality of predetermined positions being selected by the multi-position selector, cause the one of the trip parameter combinations corresponding to the chosen one of the plurality of predetermined positions to be used by the electronic trip unit to determine whether to cause the operating mechanism to trip open the separable contacts.

13 Claims, 3 Drawing Sheets

(56) References Cited

U.S. PATENT DOCUMENTS

| | | | |
|---|---|---|---|
| 5,525,985 A | 6/1996 | Schlotterer et al. | |
| 5,910,760 A | 6/1999 | Malingowski et al. | |
| 6,144,271 A | 11/2000 | Mueller et al. | |
| 6,603,649 B1 * | 8/2003 | Muller | H02H 7/30 361/93.3 |
| 6,798,630 B1 | 9/2004 | Del Vecchio et al. | |
| 7,948,343 B2 * | 5/2011 | Carlino | H02H 3/006 336/115 |
| 2005/0047045 A1 * | 3/2005 | Puskar | H02H 3/006 361/115 |
| 2005/0258921 A1 * | 11/2005 | Puskar | H01H 71/0228 335/17 |
| 2007/0252599 A1 | 11/2007 | Zhou et al. | |
| 2009/0154046 A1 * | 6/2009 | Robinson | H01H 71/74 361/95 |
| 2009/0195337 A1 * | 8/2009 | Carlino | H01H 71/7463 335/18 |
| 2009/0326900 A1 * | 12/2009 | Carlino | H02H 3/006 703/14 |
| 2014/0118875 A1 * | 5/2014 | Carlino | H01H 71/74 361/93.2 |
| 2014/0170971 A1 * | 6/2014 | Walsh | H04B 5/0031 455/41.1 |
| 2014/0266519 A1 * | 9/2014 | Carlino | H01H 47/001 335/7 |

* cited by examiner

CIRCUIT PROTECTION APPARATUS AND METHOD OF SETTING TRIP PARAMETERS THEREOF

BACKGROUND

Field

The disclosed concept pertains generally to circuit protection devices, such a circuit breakers having configurable electronic trip units and motor protectors, and, more particularly, a simplified method of setting the trip parameters of circuit protection devices.

Background Information

Circuit interrupters, such as circuit breakers, are generally old and well known in the art. Circuit breakers are used to protect electrical circuitry from damage due to an overcurrent condition, such as an overload condition or a relatively high level short circuit or fault condition.

Small circuit breakers used for residential and light commercial applications (in load centers and panelboards) are commonly referred to as miniature circuit breakers (MCBs). Circuit protection in MCBs is typically provided by a thermal-magnetic trip device. This trip device includes a bimetal, which heats and bends in response to a persistent overcurrent condition. The bimetal, in turn, unlatches a spring powered operating mechanism, which opens the separable contacts of the circuit breaker to interrupt current flow in the protected power system.

Another type of circuit breaker, known as a molded case circuit breaker (MCCB), is typically used in switchboards and switchgear. MCCBs typically include a pair of separable contacts per phase. The separable contacts may be operated either manually by way of a handle disposed on the outside of the case or automatically response to an overcurrent condition. Typically, such circuit breakers include: (i) operating mechanism which is designed to rapidly open and close the separable contacts, and (ii) a trip unit which senses overcurrent conditions in an automatic mode of operation. Upon sensing an overcurrent condition, the trip unit trips the operating mechanism to a trip state, which moves the separable contacts to their open position.

It is well known to employ trip units which detect various types of overcurrent trip conditions and provide various protection functions, such as, for example and without limitation, a long delay trip, a short delay trip, an instantaneous trip, and/or a ground fault trip. The long delay trip function protects the load served by the protected electrical system from overloads and/or overcurrents. The short delay trip function can be used to coordinate tripping of downstream circuit breakers in a hierarchy of circuit breakers. The instantaneous trip function protects the electrical conductors to which the circuit breaker is connected from damaging overcurrent conditions, such as short circuits. As implied, the ground fault trip function protects the electrical system from faults to ground.

The earliest electronic trip unit circuit designs utilized discrete components such as transistors, resistors and capacitors. More recently, designs, such as disclosed in U.S. Pat. Nos. 4,428,022; and 5,525,985, have included microprocessors, which provide improved performance and flexibility. These digital systems sample the current waveforms periodically to generate a digital representation of the current. The microprocessor uses the samples to execute algorithms, which implement one or more current protection curves.

Electronic trip units have various settings (commonly referred to as trip parameters or trip settings) which can be adjusted to change the behavior of the electronic trip unit (i.e., to specify one or more of the long delay trip, short delay trip, instantaneous trip, and/or a ground fault trip functions). Several known electronic trip units include an interface panel which is used to adjust the trip parameters of the electronic trip unit. One known electronic trip unit includes an interface panel having five rotary switches, two light emitting diodes ("LEDs"), and one test port which are used to adjust the trip parameters of the electronic trip unit. Each component on the electronic trip unit interface panel increases the cost of the electronic trip unit.

In addition, configuring the trip parameters of a circuit breaker can be a difficult task. Often, the trip parameters are left in the most protective levels (factory default) until a trip occurs. In servicing after a trip, the trip parameters are often set to the least protective levels out of ignorance and a desire to avoid another trip.

There is thus a need for a mechanism for configuring the trip parameters of a circuit interrupter which reduces the cost of the electronic trip unit while at the same time allowing settings to be established which better match the application (avoid nuisance trips but protect for a real fault) without requiring a detailed knowledge of circuit interrupter operation.

SUMMARY

In one embodiment, a circuit protection apparatus is provided that includes separable contacts, an operating mechanism configured to open and close the separable contacts, an electronic trip unit structured to cooperate with the operating mechanism to trip open the separable contacts, the electronic trip unit storing a plurality of trip parameter combinations, wherein each of the trip parameter combinations specifies a certain value for each of a plurality of individual trip parameters, and a multi-position selector moveable among a plurality of predetermined positions and configured to enable selection of one of the plurality of predetermined positions. Each of the predetermined positions corresponds to a respective one of the trip parameter combinations, wherein the electronic trip unit is structured to, responsive to a chosen one of the plurality of predetermined positions being selected by the multi-position selector, cause the one of the trip parameter combinations corresponding to the chosen one of the plurality of predetermined positions to be used by the electronic trip unit to determine whether to cause the operating mechanism to trip open the separable contacts.

In another embodiment, a method of configuring a circuit protection apparatus as just described is provided. The method includes storing a plurality of trip parameter combinations in the electronic trip unit, wherein each of the trip parameter combinations specifies a certain value for each of a plurality of individual trip parameters, and wherein each of the predetermined positions corresponds to a respective one of the trip parameter combinations, receiving in the electronic trip unit a selection of a chosen one of the plurality of predetermined positions, and responsive to the receiving, configuring the electronic trip unit to use the one of the trip parameter combinations corresponding to the chosen one of the plurality of predetermined positions when determining whether to cause the operating mechanism to trip open the separable contacts.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
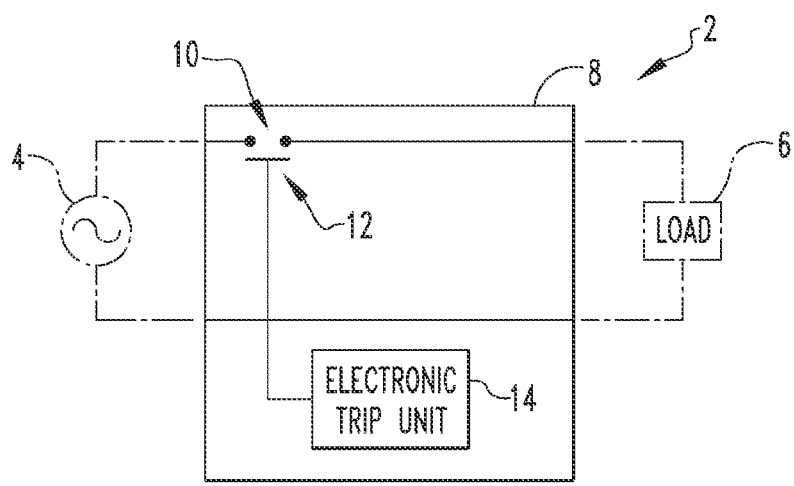
FIG. 1 is a schematic diagram of an electrical system according to one non-limiting exemplary embodiment of the present invention.

Directional phrases used herein, such as, fur example, left, right, front, back, top, bottom and derivatives thereof, relate to the orientation of the elements shown in the drawings and are not limiting upon the claims unless expressly recited therein.

As employed herein, the term "number" shall mean one or an integer greater than one (i.e., a plurality).

As employed herein, the statement that two or more parts are "coupled" together shall mean that the parts are joined together either directly or joined through one or more intermediate parts.

Figure 2:
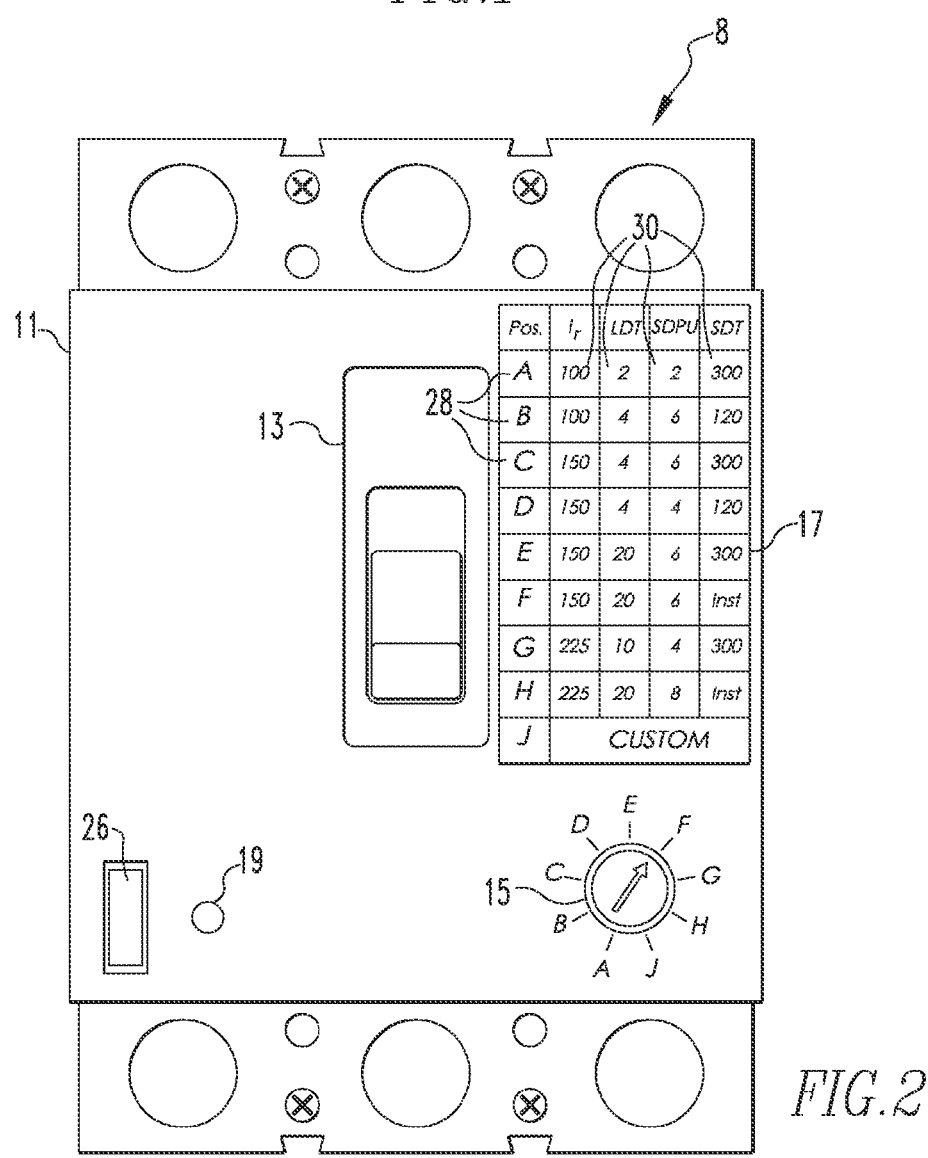
FIG. 2 is a front elevational view of a circuit interrupter (in the form of an MCCB) of the system of FIG. 1 according to an exemplary embodiment.

FIG. 1 is a schematic diagram of an electrical system 2 according to an exemplary embodiment of the present invention. Electrical system 2 includes a power source 4, a load 6, and a circuit interrupter 8. In the non-limiting exemplary embodiment, circuit interrupter 8 is a circuit breaker, and in particular an MCCB as shown in FIG. 2. Circuit interrupter 8 is configured to protect the power circuit including power source 4 and load 6 from damage due to an overcurrent condition. Referring to FIGS. 1 and 2, circuit interrupter 8 includes separable contacts 10, an operating mechanism 12 structured to open and close separable contacts 10, and an electronic trip unit 14 which cooperates with operating mechanism 12 to trip open separable contacts 10, all housed within a housing 11. Circuit interrupter 8 also includes a handle 13 for manually opening and closing separable contacts 10. In addition, and according an aspect of the disclosed concept, housing 11 of circuit interrupter 8 is further provided with a rotary switch 15 (coupled to a microprocessor 16 described below) and a table 17 for use in setting and adjusting the functional trip parameters of circuit interrupter 8 as described in greater detail herein below. In the exemplary embodiment, table 17 is separately printed and affixed to the front of housing 11. In alternative embodiments, table 17 may be printed directly on the front of housing 11, displayed on an LCD screen provided on the front of housing 11, or provided elsewhere on or off of the housing lit. As described in detail elsewhere herein, table 17 lists a number of preconfigured functional trip parameter combinations of circuit interrupter 8 that may be selected by rotary switch 15. Finally, circuit interrupter 8 includes status LED 19 for indicating a number of status conditions of circuit interrupter 8.

Figure 3:
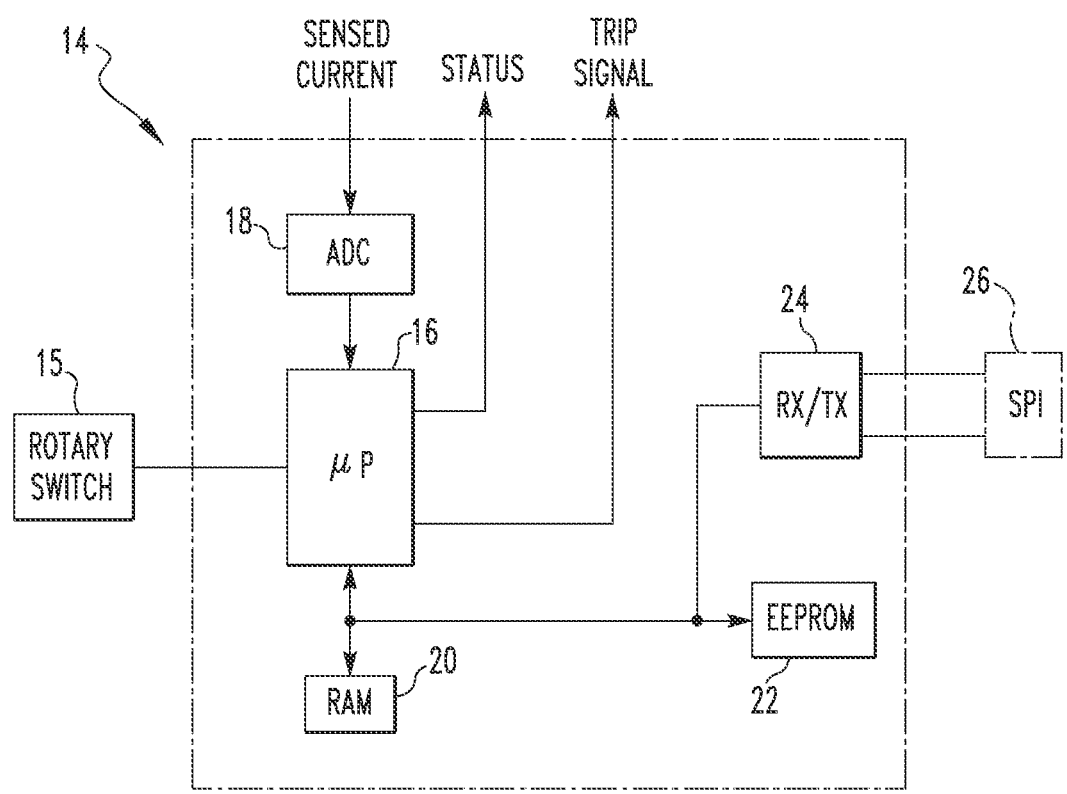
FIG. 3 is a schematic diagram showing certain selected components of an electronic trip unit forming part of the circuit interrupter of FIG. 2.

FIG. 3 is a schematic diagram showing certain selected components of electronic trip unit 14 of circuit interrupter 8 according to the exemplary embodiment. As seen in FIG. 3, electronic trip unit 14 includes a microprocessor (μP) 16 which controls the operation of electronic trip unit 14. Alternatively, microprocessor 16 may be another type of processing or control unit, such as, without limitation, a microcontroller or some other suitable processing device. Electronic trip unit 14 further includes an analog-to-digital converter (ADC) 18, a random access memory (RAM) 20, and an EEPROM 22, each of which is coupled to microprocessor 16. ADC 18 is structured to receive signals, such as a number of current signals (indicating the current of the circuit to which circuit interrupter 8 is connected) that are sensed by sensors (not shown; e.g., a number of current transformers or Rogowski coils) forming part of circuit interrupter 8 and convert those signals to digital data that is appropriate for microprocessor 16. As will be appreciated, that data may be stored in RAM 20 and/or used by the trip unit program implemented in and run by microprocessor 16 in determining whether and when to issue a trip signal for tripping operating mechanism 12. In addition, in the exemplary embodiment, EEPROM 22 stores (in nonvolatile memory) the functional trip parameters of electronic trip unit 18 which define the operating characteristics thereof, and which are read into microprocessor 16 as needed by the trip unit program.

Electronic trip unit 18 also includes a communication interface 24 coupled to a serial port interface (SPI) 26 provided in housing 11 (FIGS. 2 and 3). Communication interface 24 is, in turn, operatively coupled to microprocessor 26 to allow for serial data communication with microprocessor 26.

As noted above, and according to an aspect of the present invention, circuit interrupter 8 is provided with a number of preconfigured functional trip parameter combinations, wherein each such combination specifies a certain value for a number of individual trip parameters. In the exemplary embodiment, the preconfigured functional trip parameter combinations are stored at the time of manufacture in EEPROM 22, where they later may be selected as described herein for use by the trip unit program implemented in and run by microprocessor 16.

The functional trip parameters making up the preconfigured functional trip parameter combinations may include any known or hereafter developed trip parameters that are utilized by a circuit interrupter, such as circuit interrupter 8, for protecting a circuit from overcurrent conditions. For example, and without limitation, such trip parameters may include any of the following: (i) continuous current setting (Ir), which is the maximum current that a circuit interrupter is configured to carry without tripping, and which may be specified in amps or as a percentage or fraction (e.g., 1.0, 0.95, 0.9, 0.8, 0.75, 0.7, 0.6, 0.5) of the continuous current rating or capacity (In) of the circuit interrupter; (ii) long delay pickup (LDT), which specifies the current at which a long delay trip will be caused to occur, and which is typically a small overload or multiple of Ir (e.g., 110% of Ir); (iii) long delay time (LDT), which is the time (typically in seconds (e.g., (2, 4, 7, 10, 12, 15, 20, 24)) that the circuit interrupter is configured to carry the long delay pickup current (or greater) before tripping; (iv) short delay pickup (SDPU), which specifies the current at which a short delay trip will be caused to occur, and which is typically a multiple of Ir (e.g., 2×, 3×, 4×, 5×, 6×, 7×, 8×, 10×); (v) short delay time (SDT), which is the time (typically in milliseconds (e.g., 100, 200, 300, 400, 500)) that the circuit interrupter is configured to carry the short delay pickup current (or greater) before tripping; (vi) instantaneous pickup (IPU), which is the maximum current that the breaker circuit interrupter is configured to carry before instantly tripping (typically in multiples of In (2×, 3×, 4×, 6×, 8×, 10×, 12×));

(vii) ground fault pickup (GFPU), which specifies the ground current at which a ground fault trip will be caused to occur, and which is typically a fraction of In (e.g., 1.0, 0.75, 0.6, 0.5, 0.4, 0.35, 0.3, 0.25); (viii) ground fault delay time (GFT), which is the time (typically in seconds (0.1, 0.2, 0.3, 0.4, 0.5) that a circuit interrupter will allow a ground fault current (Ig times Ir) equal to or greater than the ground fault pickup before tripping; and (ix) maintenance mode (MM), which is expressed in multiples of Ir (off, 2, 4, 6, 8, 10) and which, if not in "off", will instantly trip a circuit interrupter when a current level (mm times Ir) is met regardless of other pickups and times.

In the illustrated, non-limiting exemplary embodiment shown in FIG. 2, the particular trip parameters that are used in the saved preconfigured functional trip parameter combinations are Ir, LDT, SDPU and SDT. In other words, circuit interrupter 8 will be loaded with and store (in EEPROM 22) a number of preconfigured functional trip parameter combinations, wherein each combination specifies a value for SDPU and SDT (with LDPU being set at 110% of Ir for all combinations). It will be understood, however, that this is meant to be exemplary only and that other or different particular trip parameters may be used in the saved preconfigured functional trip parameter combinations. In addition, the preconfigured functional trip parameter combinations are listed in table 17 for display to a user, with each such combination having an associated position identifier 28 and associated values 30. Furthermore, each of the preconfigured functional trip parameter combinations stored in EEPROM 22 is associated with a specific position (A-H) of rotary switch 15, with the position also corresponding to the position identifier 28 listed in table 17.

Thus, in operation, a specific one of the preconfigured functional trip parameter combinations may be selected as desired by a user for use in circuit interrupter 8 at any particular time by moving rotary switch 115 (e.g., using a small screwdriver or another suitable tool) to the position thereof that corresponds to the desired/selected combination. In response, the selected combination (i.e., the values for Ir, LDT, SDPU and SDT) will be caused to be loaded into microprocessor 16 for use by the trip unit program of circuit interrupter 8. If the user desires to thereafter change the configuration of circuit interrupter 8, he or she simply needs to move rotary switch 15.

Accordingly, the present invention provides a mechanism by which the trip parameters of circuit interrupter 8 may simply and easily be set to any one of a number of predetermined configurations without requiring power to circuit interrupter 8. Also, the current trip parameter settings for circuit interrupter 8 may be easily read without the need for power to circuit interrupter 8 simply by determining the position of rotary switch 15 and consulting table 17.

In one particular embodiment, the preconfigured functional trip parameter combinations (also referred to as profiles) would be selected and established such that a number of profiles would be appropriate for breaker coordination, a number of profiles would be appropriate for fuses, number of profiles would be appropriate for transformers, number of profiles would be appropriate for motors, etc.

In addition, in the illustrated embodiment, a user may instead cause a custom configuration to be entered into circuit interrupter 8 by coupling an electronic device, such as a PC, laptop, tablet or Smartphone, to SPI 26 and moving rotary switch 15 to position J. In such a condition, the trip parameter values comprising the custom configuration may be loaded into and stored by EEPROM 22 for use by the trip unit program of circuit interrupter 8.

Figure 4:
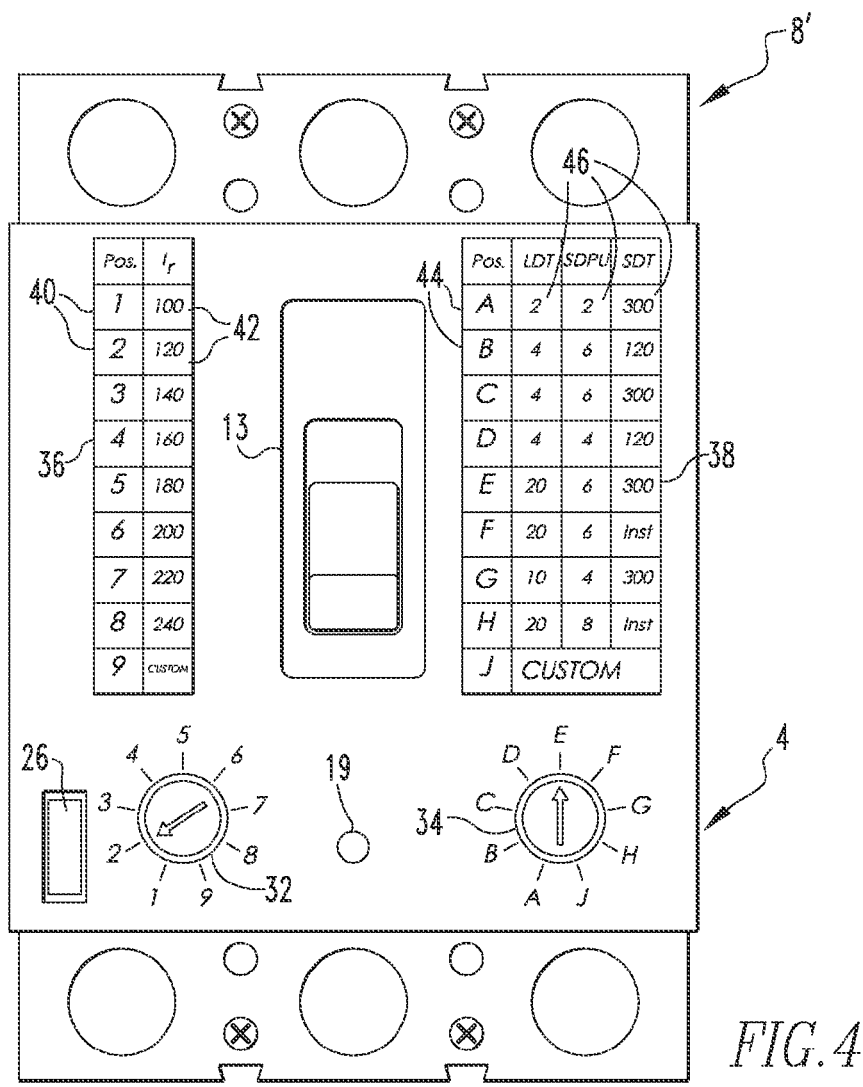
FIG. 4 is a front elevational view of a circuit interrupter (in the form of an MCCB) according to an alternative exemplary embodiment.

FIG. 4 is a front elevational view of a circuit interrupter 8' (in the form of MCCB) according to an alternative exemplary embodiment. Circuit interrupter 8' is similar to circuit interrupter 8, and includes an electronic trip unit as shown in FIG. 3. Circuit interrupter 8' is different than circuit interrupter 8 in that it allows a first set of one or more trip parameters and a second set of one or more trip parameters to be independently set and adjusted through operation of two separate rotary switches 32 and 34. More specifically, circuit interrupter 8' will be loaded with and store (in EEPROM 22) a number of first preconfigured functional trip parameter combinations and a number of second preconfigured functional trip parameter combinations, wherein each combination specifies a value for a number of trip parameters. In the illustrated, non-limiting exemplary embodiment shown in FIG. 4, each of the first preconfigured functional trip parameter combinations specifies a value for Ir, and each of the second preconfigured functional trip parameter combinations specifies values for LDT, SDPU and SDT (with LDPU being set at 110% of Ir for all combinations). In addition, the first preconfigured functional trip parameter combinations are listed in table 36 for display to a user, with each combination having an associated position identifier 40 and associated values 42. Similarly, the second preconfigured functional trip parameter combinations are listed in table 38 for display to a user, with each combination having an associated position identifier 44 and associated values 46. Furthermore, each of the first preconfigured functional trip parameter combinations stored in EEPROM 22 is associated with a specific position (1-8) of rotary switch 32, with the position also corresponding to the position identifier 40 listed in table 36, and each of the second preconfigured functional trip parameter combinations stored in EEPROM 22 is associated with a specific position (A-H) of rotary switch 34, with the position also corresponding to the position identifier 44 listed in table 38.

Thus, in operation, as desired, a specific one of the first preconfigured functional trip parameter combinations may be selected by a user for use in circuit interrupter 8 at any particular time by moving rotary switch 32 (e.g., using a small screwdriver or another suitable tool) to the position thereof that corresponds to the selected combination, and a specific one of the second preconfigured functional trip parameter combinations may be selected by a user for use in circuit interrupter 8 at any particular time by moving rotary switch 34 (e.g., using a small screwdriver or another suitable tool) to the position thereof that corresponds to the selected combination. In response, the selected combinations (i.e., the values for LDT, SDPU and SDT) comprising the overall configuration for circuit interrupter 8' will be caused to be loaded into microprocessor 16 for use by the trip unit program of circuit interrupter 8'.

Figure 5:
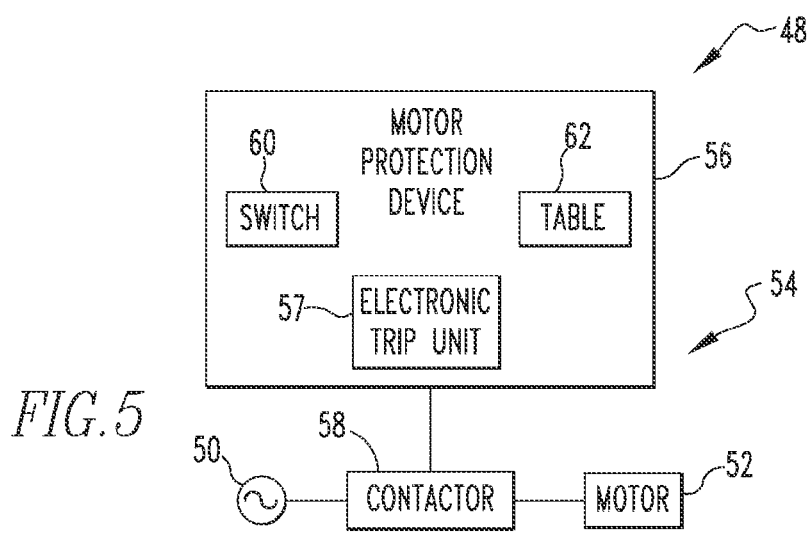
FIG. 5 is a schematic diagram of an electrical system according to an alternative exemplary embodiment of the present invention.

The disclosed concept has above been described in connection with systems employing circuit interrupters in the form of circuit breakers. The disclosed concept is not, however, limited to such a applications, and instead may be employed in connection with other types of circuit protection apparatuses. For example, FIG. 5 is a schematic diagram of an electrical system 48 according to an alternative exemplary embodiment present invention. Electrical system 48 includes a power source 50, a motor 52, and a circuit protection apparatus 54 comprising a motor protection device 56 coupled having a microprocessor based electronic trip unit 57 coupled to a contactor 58 having an operating mechanism and separable contacts for protecting motor 52 from damage due to an overcurrent condition, such as an overload condition or a relatively high level short circuit or fault condition. More specifically, circuit protection apparatus 54 has several configurable features, and, much like the circuit breakers described elsewhere herein, has many possible trip parameter settings that may be selected to match the protection to motor 52. Typical settings include: (1) FLA, which is full load amps and which is an overall protection setting; (2) phase toss/unbalance, which is several settings to protect when a phase is partially or fully lost; (3) ground fault; (4) phase rotation; (5) under/over voltages; and (6) voltage unbalanced. According to an aspect of the disclosed concept, the most typical settings ("profiles") for circuit protection apparatus 54 may be pre-configured and stored in motor protection device 56 so that they can be easily selected to avoid potential settings conflicts.

Thus, in system 48, motor protection device 56 is provided with a rotary switch 60 (like rotary switch 15) and a table 62 (like table 17) for use in setting and adjusting the functional settings of circuit protection apparatus 54. In the exemplary embodiment, table 62 is separately printed and affixed to the front of the housing of motor protection device 56. In alternative embodiments, table 62 may be printed directly on the front of the housing, displayed on an LCD screen provided on the front of housing, or provided elsewhere on or off the housing. Table 62 lists a number of preconfigured functional setting combinations of circuit protection apparatus 54 (each a "profile") that may be selected by the rotary switch 60.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A circuit protection apparatus, comprising:
    separable contacts;
    an operating mechanism configured to open and close the separable contacts;
    an electronic trip unit structured to cooperate with the operating mechanism to trip open the separable contacts, wherein the electronic trip unit has pre-stored therein a plurality of trip parameter combinations, wherein each of the trip parameter combinations specifies a certain value for each of a plurality of individual trip parameters; and
    a multi-position selector in the form of a single selector switch moveable among a plurality of predetermined positions and configured to enable selection of one of the plurality of predetermined positions, each of the predetermined positions corresponding to a respective one of the trip parameter combinations pre-stored in the electronic trip unit, wherein the electronic trip unit is structured to, responsive to a chosen one of the plurality of predetermined positions being selected by the multi-position selector, cause the one of the pre-stored trip parameter combinations corresponding to the chosen one of the plurality of predetermined positions to be used by the electronic trip unit to determine whether to cause the operating mechanism to trip open the separable contacts.

2. The circuit protection apparatus according to claim 1, wherein the multi-position selector includes a plurality of position indicators, each of the position indicators corresponding to a respective one of the predetermined positions, wherein the trip parameter combinations and the position indicators are displayed in a table in a manner wherein each of the trip parameter combinations is associated with a respective one of the position indicators.

3. The circuit protection apparatus according to claim 2, wherein the electronic trip unit is provided in a housing, and wherein the multi-position selector and the table are provided on a front of the housing.

4. The circuit protection apparatus according to claim 1, wherein the multi-position selector is a rotary switch.

5. The circuit protection apparatus according to claim 1, wherein the circuit protection apparatus is a circuit interrupter and wherein the number of individual trip parameters include Ir, LDT, SDPU and SDT.

6. The circuit protection apparatus according to claim 5, wherein the electronic trip unit stores a plurality of second trip parameter combinations, wherein each of the second trip parameter combinations specifies a certain value for each of a number of second individual trip parameters, and wherein the circuit interrupter includes a second multi-position selector moveable among a plurality of second predetermined positions and configured to enable selection of one of the plurality of second predetermined positions, each of the second predetermined positions corresponding to a respective one of the second trip parameter combinations, wherein the electronic trip unit is structured to, responsive to a chosen one of the plurality of second predetermined positions being selected by the second multi-position selector, cause the one of the second trip parameter combinations corresponding to the chosen one of the plurality of second predetermined positions to also be used by the electronic trip unit to determine whether to cause the operating mechanism to trip open the separable contacts.

7. The circuit protection apparatus according to claim 6, wherein the number of individual trip parameters include LDT, SDPU and SDT and the number of second individual trip parameters is Ir.

8. The circuit protection apparatus according to claim 6, wherein the second multi-position selector includes a plurality of second position indicators, each of the second position indicators corresponding to a respective one of the second predetermined positions, wherein the second trip parameter combinations and the second position indicators are displayed in a second table in a manner wherein each of the second trip parameter combinations is associated with a respective one of the second position indicators.

9. The circuit protection apparatus according to claim 1, wherein the circuit protection apparatus is a motor protector having a motor protection device including the electronic trip unit coupled to a contactor including the separable contacts and the operating mechanism.

10. A method of configuring a circuit protection apparatus including separable contacts, an operating mechanism configured to open and close the separable contacts, an electronic trip unit structured to cooperate with the operating mechanism to trip open the separable contacts, and a multi-position selector in the form of a single selector switch moveable among a plurality of predetermined positions and configured to enable selection of one of the plurality of predetermined positions, the method comprising:
    pre-storing a plurality of trip parameter combinations in the electronic trip unit, wherein each of the pre-stored trip parameter combinations specifies a certain value for each of a plurality of individual trip parameters, and wherein each of the predetermined positions corresponds to a respective one of the trip parameter combinations pre-stored in the electronic trip unit;

receiving in the electronic trip unit a selection of a chosen one of the plurality of predetermined position responsive to operation of the multi-position selector; and responsive to the receiving, configuring the electronic trip unit to use the one of the pre-stored trip parameter combinations corresponding to the chosen one of the plurality of predetermined positions when determining whether to cause the operating mechanism to trip open the separable contacts.

11. The method according to claim 10, wherein the circuit interrupter includes a second multi-position selector moveable among a plurality of second predetermined positions and configured to enable selection of one of the plurality of second predetermined positions, the method further comprising storing in the electronic trip unit a plurality of second trip parameter combinations, wherein each of the second trip parameter combinations specifies a certain value for each of a number of second individual trip parameters, wherein each of the second predetermined positions correspond to a respective one of the second trip parameter combinations, receiving in the electronic trip unit a selection of a chosen one of the plurality of second predetermined positions, and responsive to the receiving a selection of a chosen one of the plurality of second predetermined positions, configuring the electronic trip unit to also use the one of the second trip parameter combinations corresponding to the chosen one of the plurality of second predetermined positions when determining whether to cause the operating mechanism to trip open the separable contacts.

12. The method according to claim 11, wherein the circuit protection apparatus is a circuit interrupter and wherein the number of individual trip parameters include LDT, SDPU and SDT and the number of second individual trip parameters is Ir.

13. The method according to claim 10, wherein the circuit protection apparatus is a circuit interrupter and wherein the number of individual trip parameters include LDT, SDPU and SDT and the number of second individual trip parameters is Ir.

* * * * *